Patented Apr. 29, 1941

2,239,974

UNITED STATES PATENT OFFICE

2,239,974

DETERGENT COMPOSITION

Cortes F. Reed, Anoka, Minn., assignor of one-half to Charles L. Horn, Minneapolis, Minn.

No Drawing. Application June 30, 1938, Serial No. 216,852

7 Claims. (Cl. 252—161)

This invention relates to new and improved compositions comprising mixtures of neutralized compounds obtained by reacting aliphatic or cycloaliphatic compounds with a gaseous mixture of sulfur dioxide and chlorine with water-soluble salts. In a more limited sense, it relates to mixtures of neutralized compounds obtained by reacting liquid saturated aliphatic or cycloaliphatic hydrocarbons with a gaseous mixture of sulfur dioxide and chlorine with readily water-soluble salts. The invention also pertains to methods of preparing such compounds.

This invention has for an object the preparation of new and improved surface-active compositions. A further object is the preparation of improved detergent and scouring compositions. A still further object is to prepare improved detergent and scouring compositions which are stable when incorporated in aqueous acidic, neutral and alkaline media. A still further object is to improve the cleansing, detergent and scouring properties of the hydrocarbon derivatives obtained by reacting hydrocarbons with a gaseous mixture of sulfur dioxide and chlorine. Still other objects will appear hereinafter.

The above and other objects have been accomplished by the following invention which comprises a mixture of the products obtained by hydrolyzing and neutralizing the products obtained by reacting saturated, liquid, aliphatic or saturated alicyclic hydrocarbons with a gaseous mixture of sulfur dioxide and chlorine, with a water-soluble salt.

Processes for preparing the above described hydrolysis and neutralization products are disclosed in Reed U. S. Patent No. 2,046,090. To the hydrolysis and neutralization products may be added the water-soluble salts and the resulting material dried. The salts may be added to an aqueous solution containing the neutralized product or the neutralized product may be incorporated with an aqueous solution of the salts. The resulting products in any event, are dried. The dried products, upon an active ingredient basis, are very much superior in their detergent, etc. properties to the materials containing no salt. In fact, low molecular weight products which do not have appreciable surface-active properties are so enhanced by the addition of water-soluble salts that they are superior to high molecular weight products.

Preferred conditions for preparing the above described surface-active agents are described and claimed in an application for Letters Patent of A. L. Fox, C. O. Henke, W. H. Lockwood and J. M. Tinker entitled "Improved chemical processes" Ser. No. 216,838 filed upon an even date herewith, now U. S. Patent 2,202,791. It is to be distinctly understood that those conditions may be used in preparing the initial products which are to be incorporated with the water-soluble salts, compounds and compositions of this invention.

A relatively large amount of salt must be added to obtain the desired effect. Traces of salt such as might be present as an impurity do not give the necessary improvement. The compositions thus should contain at least 35% by weight of salt and can contain as high as 90% by weight of salt. The amount of salt necessary, of course, will vary according to the components to be used in the mixture.

This invention will be further illustrated, but is not intended to be limited by the following examples:

Example I

Three hundred grams of a white oil derived from a Pennsylvania crude, paraffin base petroleum which white oil consists essentially of saturated aliphatic hydrocarbons with an average carbon content of sixteen carbon atoms, is treated with a gaseous mixture of sulfur dioxide and chlorine for three hours at a temperature not exceeding 51° C. At the end of this time, 250 grams of the product are poured into 260 grams of 30% caustic soda solution. The product is diluted and the unreacted oil removed.

Example II

A detergent composition showing markedly improved action in both soft and hard water is produced by mixing 54 grams of sodium sulfate and 150 grams of a 36% solution of the detergent prepared according to Example I.

Example III

By substituting 54 grams of sodium pyrophosphate for the sodium sulfate in Example II, a composition having excellent detergency in both soft and hard water is produced.

Example IV

To 1080 grams of the detergent in Example I were added 285 grams of sodium pyrophosphate and the mixture drum dried. A product showing markedly improved detergency both in hard and soft water was produced.

Example V

Paraffin having a melting point of 124° to

126° F. A. M. P. was heated to 90°–95° C. and chlorine and sulfur dioxide gases were passed through the liquid. After a gain in weight of 20 to 25% the temperature was reduced to between 40 and 50° C. for the remainder of the reaction. The product was added to water and caustic soda was added until it became slightly alkaline. It was then dried by heating to drive off the water until a heavy paste containing 5 to 10% water was obtained. To 100 grams of sodium sulfate with stirring and the mixture was heated on a hot plate with stirring until dry. The solid product was comminuted. A water solution of the product was perfectly clear and had excellent foaming qualities.

Example VI

To one hundred grams of a paste prepared according to Example V were added 100 grams of soda ash and dried in the same manner as the previous example to form a hard, waxy cake. Aqueous solutions of the product had good foaming and detergent properties.

Similar results were obtained by adding 100 ccs. of water to 100 grams of the paste and then adding 100 grams of sodium meta silicate dissolved in a minimum amount of water.

Example VII

A mixture containing 4 parts of sodium sulfite and 1 part on a 100% basis of sulfonated product prepared as in Example I gave greatly improved detergency results in both hard and soft water.

The following salts may be substituted for those in Examples II to IV and give products with greatly improved detergency: NaCl, Na$_2$B$_4$O$_7$, Na$_2$CO$_3$, NaOOCCH$_3$, Na$_2$SO$_3$, Na$_2$SO$_4$ + "Glumin" (which is a commercial degraded glue).

The invention is not limited to the specific examples cited. As surface active components one may use any compound solubilized according to U. S. P. 2,046,090. As specific examples of starting materials mention is made of saturated hydrocarbons, mineral and vegetable oils and fats, saturated alcohols, ketones, aldehydes, acids, esters and mixtures of two or more of these and, also, their substitution products and derivatives. As specific examples of such compounds, mention is made of dodecyl, tetradecyl, hexadecyl and octadecyl alcohols, diethyl-heptyl-carbinol, diethyl-tridecanol-6, tridecanone-8, myristic, palmitic, decanoic and erucic acids, methyl stearate, ethyl palmitate, methyl laurate, lard, olive oil, etc.

In addition to the salts already listed, there can be used any water-soluble salt as, for example: sodium bromide, sodium iodide, sodium phosphate (mono-, di- and tri-basic), sodium perborate, sodium bisulfite and sodium silicate. As well as the sodium salt, there can be employed the corresponding potassium, ammonium and quaternary ammonium salts; while the inorganic salts are preferred, organic salts such as sodium acetate, benzoate, formate, lactate, malate, citrate, and tartrate, may also be used.

This invention has the advantage that products of enhanced surface activity, particularly as to detergent and cleansing power, containing surface-active agents produced according to the processes of U. S. Patent 2,046,090, may be economically and easily prepared. The products prepared from suitably purified hydrocarbons are especially valuable in this respect and represent a preferred embodiment of this invention.

The initial materials which may be incorporated with the water-soluble salts are not to be limited to the specific examples above. For instance, the concentration of caustic soda used for hydrolyzing the reaction product obtained by treating hydrocarbons with a gaseous mixture of sulfur dioxide and chlorine may be varied from 5% to 50%. The reaction is somewhat slower with the more dilute caustic soda solutions and almost instantaneous with the more concentrated solutions. Other alkali metal hydroxides such as potassium, caesium, etc., may be used. Likewise, the alkaline earth hydroxides and oxides may be employed. An aqueous solution of ammonium hydroxide may be used to yield the ammonium salt. Substituted ammonium salts or amine salts may be obtained by hydrolyzing the product with aqueous solutions of aliphatic, cycloaliphatic, aromatic and heterocyclic amines, such as dimethylamine, ethylamine, diethylamine and triethanolamine, piperidine, diethyl-cyclohexylamine, pyridine, aniline, toluidine, xylidines, β-naphthyl amine, etc. Thus, the amine salts of hydrocarbon sulfonic acid may be obtained. Also, the strong quaternary ammonium bases such as tetra-methyl-ammonium-hydroxide and tetra-ethyl-ammonium-hydroxide may be used for the hydrolysis. The resulting products would be the tetra-methyl-ammonium salt or the tetra-ethyl-ammonium salt of a hydrocarbon sulfonic acid.

Water-miscible organic solvents may be used during the hydrolysis or neutralization step to promote contact between the reaction mass and the hydrolyzing agents. As examples of such solvents or diluents may be mentioned ethyl, propyl, methyl, etc., alcohols, dioxane, glycol and its ethers and esters, e. g. ethylene glycol, diethyl ether, dimethyl ether, etc.

The water-soluble compositions produced according to this invention have considerable surface-activity and other valuable properties, and may be used as mercerizing assistants, corrosion inhibitors, gum solvents for gasoline, extractants for the refining of gasoline, pour point depressants, insecticides, fly spray ingredients, weed killers, soil fumigants, cotton immunization chemicals, anti-shrinking agents for wool, foaming agents, mold inhibitors, lubricants for steel drawing and metal working, crease-proofing agents, viscose modifiers, pharmaceuticals, detergents, wetting agents, rewetting agents, for improving textile treating processes, including wool scouring, carbonizing, fulling, sizing, desizing, bleaching, mordanting, lime soap dispersing, improvement of absorption, delustering, degumming, kier-boiling, felting, oiling, lubricating, resisting cotton in an acid bath, dyeing, printing, stripping, creping, scouring viscose rayon, etc. They may also be useful in improving dye compositions, printing paste, the preparation of lakes, the preparation of inorganic pigments and household dye preparations. They may also be useful in improving processes of dyeing leather and textile including dyeing with developed dyes, dyeing in neutral, acid or alkaline dye baths, dyeing of animal fibers with vat dyes, etc. They may also be useful in treating oil wells and to improve flooding oil bearing sands. They may also be used to improve radiator cleaning compositions, cleansing compositions as household detergent compositions, shampoos, dentifrices, washing of paper mill felts, etc. They may also be used to improve fat liquoring and leather treatment processes as well as for fat splitting agents. They may also be useful in improving the preservation of green fodder. They may also be useful in improving the removal of fibrous layers from surfaces and in metal cleaning. They may also be used to improve flotation processes of ores, pigments, coal, etc. They may also be useful in breaking petroleum emulsions or in different concentrations as emulsifying agents. They may also be useful in improving food preparations. They may be useful in improving the cooking of wood pulp. They may also be useful in providing improved ceramic assistants and processes to improve the setting of cement. They may also be useful in storage batteries and dry cells. Other uses for these products or their derivatives are as fungicides, accelerators, delusterants, extreme pressure lubricants, moth proofing agents, antiseptics, fire-proofing agents, mildew preventers, penetrating agents, anti-flexing agents, tanning agents, lathering agents, dust collecting agents, antioxidant, color stabilizer in gasoline, etc.

The surface activity of some of the herein described compositions may be modified or in some cases enhanced by the addition of other surface-active agents, e. g. alkylated naphthalene sulfonic acids and their water-soluble salts, salts of higher alkyl sulfuric acid esters as described in Bertsch Patents Nos. 1,968,794 to 1,968,797, long chain betaine derivatives both of the C— and N— and open type which are illustrated by Daimler et al. Patent No. 2,082,275, Balle et al. 2,087,565, Platz et al. Patent 2,097,864 and Balle et al. 2,101,524, long chain ammonium, sulfonium and phosphonium compounds, as well as numerous other soap substitutes.

The hydrolysis products or water-soluble salts of the above-described sulfonyl chlorides which have surface-active properties may be used in admixture with one another and/or in admixture with soap and/or soap substitutes of the prior art, for various purposes wherein soap and/or soap substitutes have previously been used or are capable of use.

As many apparently widely different embodiments of this invention may be made without departing from the spirit and scope thereof, it is to be understood that I do not limit myself to the specific embodiments thereof except as defined in the appended claims.

I claim:

1. A detergent composition consisting essentially of from 35 to 90% by weight of a water-soluble alkali metal salt of a mineral acid and the balance a surface active product prepared by reacting a saturated aliphatic hydrocarbon in a liquid state at a temperature between 30° C. and 100° C. with a gaseous mixture of sulfur dioxide and chlorine, and hydrolyzing the resulting product with an alkali metal hydroxide solution.

2. A detergent composition consisting essentially of from 35 to 90% of a water-soluble alkali metal salt of a mineral acid and the balance a surface active product prepared by reacting a white mineral oil with a gaseous mixture of sulfur dioxide and chlorine in which the former is in excess, in the presence of actinic light at a temperature of 35° C. to 70° C., and hydrolyzing and neutralizing the product with caustic soda.

3. A detergent composition consisting essentially of from 35 to 90% of a mixture of water-soluble alkali metal salts of a mineral acid and the balance a surface active product prepared by reacting a white mineral oil with a gaseous mixture of sulfur dioxide and chlorine in which the former is in excess, in the presence of actinic light at a temperature of 35° C. to 70° C., and hydrolyzing and neutralizing the product with caustic soda.

4. A detergent composition as defined by claim 1 wherein said salt is sodium sulfate.

5. A detergent composition as defined by claim 1 wherein said salt is a sodium phosphate.

6. A detergent composition as defined by claim 1 wherein said salt is a sodium borate.

7. A detergent composition as defined by claim 1 wherein said hydrocarbon contains at least 8 carbon atoms.

CORTES F. REED.